US007960520B2

(12) United States Patent
McCall et al.

(10) Patent No.: US 7,960,520 B2
(45) Date of Patent: *Jun. 14, 2011

(54) CONVERSION OF LIGNOCELLULOSIC BIOMASS TO CHEMICALS AND FUELS

(75) Inventors: Michael J. McCall, Geneva, IL (US); Robert J. Allen, Elk Grove Village, IL (US); David E. Mackowiak, Mount Prospect, IL (US)

(73) Assignee: UOP LLC, Des Plaines, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/763,538

(22) Filed: Jun. 15, 2007

(65) Prior Publication Data

US 2008/0312346 A1 Dec. 18, 2008

(51) Int. Cl.
*C07G 1/00* (2011.01)
*C08H 7/00* (2011.01)
*C08L 97/00* (2006.01)
*D21C 11/00* (2006.01)
*D21C 9/10* (2006.01)

(52) U.S. Cl. .............. 530/503; 162/14; 162/71

(58) Field of Classification Search .......... 530/503; 162/14, 71
See application file for complete search history.

(56) References Cited

U.S. PATENT DOCUMENTS

| | | | | |
|---|---|---|---|---|
| 2,937,158 A * | 5/1960 | Snyder | ............ | 527/303 |
| 2,947,739 A * | 8/1960 | Gaslini | ............ | 530/503 |
| 3,105,095 A | 9/1963 | Oshima | | |
| 3,223,698 A * | 12/1965 | Oshima et al. | ............ | 530/503 |
| 3,966,586 A | 6/1976 | Owen et al. | ............ | 208/120 |
| 4,052,292 A | 10/1977 | Espenscheid et al. | | |
| 4,115,075 A | 9/1978 | McNamee et al. | | |
| 4,139,453 A | 2/1979 | Hutchings | ............ | 208/213 |
| 4,300,009 A | 11/1981 | Haag et al. | | |
| 4,420,644 A * | 12/1983 | Huibers et al. | ............ | 568/806 |
| 4,422,959 A | 12/1983 | Lawson et al. | ............ | 502/247 |
| 4,464,481 A | 8/1984 | Hilfman et al. | ............ | 502/228 |
| 4,501,655 A | 2/1985 | Hilfman et al. | ............ | 208/110 |
| 4,591,426 A | 5/1986 | Krasuk et al. | ............ | 208/96 |
| 4,731,491 A * | 3/1988 | Urban et al. | ............ | 568/761 |
| 4,739,040 A | 4/1988 | Naae et al. | ............ | 530/503 |
| 4,891,459 A * | 1/1990 | Knight et al. | ............ | 585/240 |
| 4,935,567 A * | 6/1990 | Yokoyama et al. | ............ | 585/240 |
| 4,952,306 A | 8/1990 | Sawyer et al. | ............ | 208/216 R |
| 5,178,749 A | 1/1993 | Lopez et al. | ............ | 208/58 |
| 5,186,815 A | 2/1993 | Lenglet | | |
| 5,294,329 A | 3/1994 | Kramer | ............ | 208/108 |
| 5,298,152 A | 3/1994 | Kramer | ............ | 208/108 |
| 5,300,212 A | 4/1994 | Winter, Jr. | ............ | 208/67 |
| 5,420,088 A | 5/1995 | Silva et al. | ............ | 502/22 |
| 5,536,325 A | 7/1996 | Brink | | |
| 5,935,418 A | 8/1999 | Chakrabarty et al. | ............ | 208/108 |
| 5,959,167 A | 9/1999 | Shabtai et al. | | |
| 5,961,821 A | 10/1999 | Varadaraj et al. | ............ | 208/263 |
| 5,977,192 A | 11/1999 | Howsmon et al. | ............ | 518/700 |
| 6,043,392 A | 3/2000 | Holtzapple et al. | | |
| 6,090,859 A | 7/2000 | Howsmon et al. | ............ | 518/715 |
| 6,096,192 A | 8/2000 | Myers et al. | ............ | 208/108 |
| 6,096,196 A | 8/2000 | Varadaraj et al. | ............ | 208/263 |
| 6,100,385 A * | 8/2000 | Naae et al. | ............ | 530/502 |
| 6,162,350 A | 12/2000 | Soled et al. | ............ | 208/113 |
| 6,171,471 B1 | 1/2001 | Ferrughelli et al. | ............ | 208/96 |
| 6,172,272 B1 * | 1/2001 | Shabtai et al. | ............ | 585/242 |
| 6,183,629 B1 | 2/2001 | Bando et al. | | |
| 6,207,808 B1 * | 3/2001 | Naae et al. | ............ | 530/502 |
| 6,277,269 B1 | 8/2001 | Myers et al. | ............ | 208/19 |
| 6,355,159 B1 | 3/2002 | Myers et al. | ............ | 208/108 |
| 6,454,936 B1 | 9/2002 | Varadaraj | ............ | 208/263 |
| 6,511,937 B1 | 1/2003 | Bearden, Jr. et al. | ............ | 502/180 |
| 6,620,313 B1 | 9/2003 | Demmin et al. | ............ | 208/112 |
| 6,660,157 B2 | 12/2003 | Que et al. | ............ | 208/108 |
| 6,712,955 B1 | 3/2004 | Hou et al. | ............ | 208/216 R |
| 7,128,827 B2 | 10/2006 | Tallman et al. | | |
| 7,314,190 B2 | 1/2008 | Palm | | |
| 7,469,846 B2 | 12/2008 | Schu | | |
| 7,503,981 B2 | 3/2009 | Wyman et al. | | |
| 7,541,503 B2 | 6/2009 | Shoshany | | |
| 7,600,707 B2 | 10/2009 | Wingerson | | |
| 2003/0100807 A1 * | 5/2003 | Shabtai et al. | ............ | 585/240 |
| 2003/0115792 A1 * | 6/2003 | Shabtai et al. | ............ | 44/605 |
| 2003/0221361 A1 * | 12/2003 | Russell et al. | ............ | 44/307 |
| 2004/0108085 A1 | 6/2004 | Kettenbach et al. | ............ | 162/55 |
| 2004/0121436 A1 | 6/2004 | Blount | ............ | 435/161 |
| 2005/0119116 A1 * | 6/2005 | Espinoza et al. | ............ | 502/202 |
| 2005/0164355 A1 * | 7/2005 | Vlasenko et al. | ............ | 435/101 |
| 2006/0243323 A1 * | 11/2006 | Wantling et al. | ............ | 137/87.01 |
| 2007/0125369 A1 * | 6/2007 | Olson et al. | ............ | 127/37 |

(Continued)

FOREIGN PATENT DOCUMENTS

EP 0010243 9/1981

(Continued)

OTHER PUBLICATIONS

Rezzoug et al. Biomass and Bioenergy 11(4), 1996, 343-352.*

(Continued)

*Primary Examiner* — Mark Eashoo
*Assistant Examiner* — Liam J Heincer
(74) *Attorney, Agent, or Firm* — Arthur E Gooding

(57) ABSTRACT

A method for preparing biomass for slurry processing. The method includes solubilizing the solid material into either a dissolved state or a suspended solid in a liquid phase, and treating the liquid phase to produce chemicals and fuels.

15 Claims, No Drawings

U.S. PATENT DOCUMENTS

| | | | |
|---|---|---|---|
| 2007/0135669 A1* | 6/2007 | Koivusalmi et al. | 585/331 |
| 2008/0050792 A1* | 2/2008 | Zmierczak et al. | 435/161 |
| 2008/0058563 A1* | 3/2008 | Dumesic et al. | 585/240 |
| 2008/0312346 A1 | 12/2008 | McCall et al. | |
| 2008/0312476 A1 | 12/2008 | McCall | |
| 2008/0312479 A1 | 12/2008 | McCall | |

FOREIGN PATENT DOCUMENTS

| | | |
|---|---|---|
| EP | 00010243 B1 | 9/1981 |
| JP | 57183484 A * | 11/1982 |
| WO | 2006119219 A2 | 11/2006 |

OTHER PUBLICATIONS

Aronovsky et al. Industrial and Engineering Chemistry 28(11), 1936, 1270-1276.*

Potassium Carbonate, Hawley's Condensed Chemcical Dictionary, 14th Edition, 2002.*

Translation of JP 57-183484, 2009.*

Elliott, D. et al. "Developments in Direct Thermochemical Liquefaction of Biomass: 1983-1990" 1991 American Chemical Society pp. 399-410.

Demirbas, A. et al. "Effect of lignin content on aqueous liquefaction products of biomass" 2000 Elsevier Science Ltd., pp. 1601-1607.

Mohan, D. et al. "Pyrolysis of Wood/Biomass for Bio-oil: A Critical Review" American Chemical Society Published on Web 00/00/0000.

Qu, Y. et al. "Experimental study on the direct liquefaction of *Cunninghamia lanceolata* in water" Energy 28, published by Elsevier Science Ltd. (2003), pp. 597-606.

Kim, T. et al. "Fractionation of corn stover by hot-water and aqueous ammonia treatment" Bioresource Technology 97 (2006), 2005 published by Elsevier Ltd. pp. 224-232.

Gupta, D. et al. "Catalytic Hydrogenation and Hydrocracking of Oxygenated Compounds to Liquid and Gaseous Fuels" Ind. Eng. Chem., Process Des. Dev., vol. 15, No. 2, 1976 pp. 256-260.

Boocock, D. et al. "The Production of Synthetic Organic Liquids from Wood Using a Modified Nickel Catalyst" The Canadian Journal of Chemical Engineering, vol. 58, Aug. 1980 pp. 466-469.

Huibers, D. et al. "Fuels and Chemical Feedstocks from Lignocellulosic Biomass" The Canadian Journal of Chemical Engineering, vol. 58, Dec. 1980 pp. 718-722.

Gevert, B. et al. "Upgrading of Directly Liquefied Biomass to Transportation Fuels: Catalytic Cracking" 1987 Elsevier Applied Science Publishers Ltd., England pp. 173-183.

Walton, T. et al. "Conversion of cellulose to hydrocarbons" Fuel, 1981, vol. 60, Aug. 1981 IPC Business Press, pp. 650-654.

Kranich, W. et al. "Oil and Gas from Cellulose by Catalytic Hydrogenation" The Canadian Journal of Chemical Engineering, vol. 58, Dec. 1980, pp. 735-738.

Petrus, L. et al. "Biomass to biofuels, a chemical perspective" journal: The Royal Society of Chemistry 2006, Green Chem., 2006, 8, pp. 861-867.

Solantausta, Y. et al. "Assessment of Liquefaction and Pyrolysis Systems" 1992 Pergamon Press Ltd., Biomass and Bioenergy vol. 2, Nos. 1-6, pp. 279-297.

Demirbas, A. "Aqueous Glycerol Delignification of Wood Chips and Ground Wood" 1998 Elsevier Science Ltd., Great Britain, Bioresource Technology 63 (1998) pp. 179-185.

Mohan et al, Pyrolysis of Wood/Biomass for Bio-oil: A Critical Review, Energy & Fuels, 2006, vol. 20, No. 3, pp. 848-889.

Supplementary European Search Report for EP08770679, Dec. 6, 2010, 3 pages.

* cited by examiner

CONVERSION OF LIGNOCELLULOSIC BIOMASS TO CHEMICALS AND FUELS

FIELD OF THE INVENTION

This invention relates to processes for obtaining hydrocarbons from biomass. More particularly, this invention relates to the treatment of lignin and cellulosic biomass to produce aromatics useful in gasoline and diesel fuels, and to produce useful chemical precursors for the chemical industry.

BACKGROUND OF THE INVENTION

Renewable sources of chemicals are of increasing importance. They are a means of reducing dependence on imported oil for conversion to plastic precursors and provide a substitute for basic chemical precursors. Renewable resources can provide for basic chemical constituents to be used in many industries, such as chemical monomers for the making of plastics, and biomass is a renewable resource that can provide some of the needs for sources of chemicals and fuels.

Biomass includes, but is not limited to, plant parts, fruits, vegetables, plant processing waste, wood chips, chaff, grain, grasses, corn, corn husks, weeds, aquatic plants, hay, paper, paper products, recycled paper and paper products, and any cellulose containing biological material or material of biological origin. The economics depend on the ability to produce large amounts of biomass on marginal land, by increasing the yield per acre, or in a water environment where there are few or no other significantly competing economic uses of that land or water environment. Increasing the yield per acre can mean increasing the recovery of useful chemicals from the biomass, as opposed to increasing the growth of biomass per acre. The economics can also depend on the disposal of biomass that would normally be placed in a landfill.

The growing, harvesting and processing of biomass in a water environment provides a space where there is plenty of sunlight and nutrients while not detracting from more productive alternate uses. In addition, biomass contributes to the removal of carbon dioxide from the atmosphere as the biomass grows. The use of biomass can be one process for recycling atmospheric carbon while producing fuels and chemical precursors.

An important component of biomass is the lignin present in the solid portions of the biomass. The lignin comprises chains of aromatic and oxygenate constituents forming larger molecules that are not easily treated. A major reason for difficulty in treating the lignin is the inability to disperse the lignin for contact with catalysts that can break the lignin down.

SUMMARY OF THE INVENTION

The present invention is a process for the direct conversion of solid biomass to liquid hydrocarbons and oxygenates. The process comprises dispersing solid biomass in a liquid phase with an appropriate solvent, or dispersion agent. The preferred dispersion agent is a polar protic solvent for dissolving and dispersing the solid biomass into a dispersed liquid phase. The dispersed liquid phase is then contacted with a deoxygenation catalyst at reaction conditions to break apart biopolymers in the biomass. The reactor can be a hydroprocessing unit, or a slurry reactor operated at mild hydroprocessing conditions under a hydrogen rich atmosphere.

Other objects, advantages and applications of the present invention will become apparent to those skilled in the art from the following detailed description.

DETAILED DESCRIPTION OF THE INVENTION

The development of biomass as a source of fuel and chemicals depends on the ability to process the large volume of lignocellulosic biomass available. The value of biomass conversion is significantly enhanced with processes that increase yield.

The present invention provides for the recovery of chemicals and organic materials for fuels and chemicals. The process comprises preparing solid biomass for slurry processing by adding an organic solvent to solubilize and disperse the solid lignocellulose, thereby creating a dispersed lignocellulose phase. In addition, the process reacts the dispersed lignocellulosic mass directly to useful hydrocarbon compounds and oxygenates through contacting with a catalyst. The lignocellulose comprises lignin, cellulose and hemicellulose. Lignin comprises large macromolecules that includes aromatic groups useful in many fuels and chemicals, and cellulose and hemicellulose comprise polysaccharides which are polymers of sugars, or long chain carbohydrates. The lignocellulose has a polar nature that prevents good interaction with many of the liquids normally used to form liquid suspension phases, such as non-polar hydrocarbon solvents. Extracting some organics can be unsuccessful because the clumping of lignocellulose and lignocellulose chars which prevent good contact with the catalyst, even when heated to typical hydroprocessing temperatures. In order to overcome this clumping, the solids in the biomass needs to be dispersed for better contact with the catalyst. Dispersion agents need to address the polar considerations, and the agents include polar-aprotic and polar-protic solvents, oxygenates, and water soluble organics. Preferred dispersion agents include aldehydes, ketones, alcohols, diols, triols, cyclic oxygenate compounds, organic acids, and mixtures thereof. Specific dispersion agents include glycerol, acetone, tetrahydrofuran, methyl tert-butyl ether, and mixtures thereof.

In another embodiment, a dispersion agent can be a non-polar viscous material. A low volatility viscous paraffin mixture can provide good dispersion of finely divided biomass particles. This provides the necessary dispersion for enhancing contact between the biomass particles and subsequently added catalyst. The use of a long chain normal paraffin, such as Norpar-15, is one example of a non-polar solvent useful for dispersion of fine biomass particles. Norpar-15 is a normal paraffin that is commercially sold as an oil by ExxonMobil.

The dispersed lignocellulose phase can be further dispersed with the addition of a second dispersion agent, thereby creating a suspension phase. The second dispersion agent improves the solubilization of the solids and facilitates further dispersion of the solids in the slurry. It is preferred that the second dispersion agent be less volatile and to be an organic solvent, thereby increasing the dispersion, suspension, and dissolution of solid materials in the biomass, which facilitates contact with the catalyst. The second dispersion agent can be either a polar protic, such a long chain organic acid; larger polar aprotic solvents, such as a fatty acid methyl ester; or a non-polar viscous hydrocarbon, such as long-chain paraffins. The second dispersion agent helps to limit the consumption of the first, smaller dispersion agent in the process of cracking the lignin, or the carbohydrates. Some forms of the second dispersion agent can also be recycled and reused since it will be unreactive in the process.

Water is a useful additive to facilitate dispersion and dissolution of organic oxygenates from the biomass into an aqueous phase as organic oxygenates are released from the solid phase, and can further assist in the dispersion of polar organic compounds.

The dispersed lignocellulose phase is contacted with a deoxygenation catalyst to break up the large biopolymers into smaller oxygenate and hydrocarbon compounds. Lignin comprises aromatic ring compounds that are linked together through oxygen atoms. Breaking the oxygen bonds produces smaller aromatic compounds useful for chemical precursors and fuels. Cellulosic materials comprise long chain carbohydrates, that can be broken into smaller carbohydrates, including sugars, that can also be used for chemical precursors and fuels. The deoxygenation process is carried out in a slurry reactor where the dispersed solid lignin phase is contacted with a catalyst.

Slurry hydroprocessing is a particularly suitable process for the hydroprocessing of biomass. The processing occurs with a catalytic slurry under hydroprocessing conditions in a slurry reactor, and with the subsequent continuous separation of a liquid effluent stream from the catalyst particles in the reactor and the removal of the liquid effluent stream. The liquid effluent stream can be further processed to create a first product stream and a second stream. The second stream can comprise solvents used in the process of creating the biomass slurry and can be recycled. Further separation of the product stream and/or the second stream can create a third stream to be sent for further processing or routing for waste disposal after appropriate treatment. The liquid effluent stream can be drawn off through a filtering system that separates out the catalyst particles and returns the particles to the reactor.

Further incorporated in the reactor, is a solids handling process for solids that precipitate out in the reactor, and need to be collected. The solids will need to be separated from catalyst particles for the recycling of the catalyst particles back to the reactor.

In an alternate method of slurry hydroprocessing, a liquid effluent stream is drawn off the slurry reactor, where the effluent stream includes solids. The effluent stream is separated into a first stream comprising a liquid stream, and a second stream comprising solids, including any catalyst particles. The second stream is processed to separate out the catalyst particles and return the catalyst particles to the slurry reactor.

In one embodiment, the catalyst is prepared as a dispersed colloidally suspended phase to facilitate mixing and contact between the catalyst and the dispersed solids in an organic liquid. Suspension of the catalyst facilitates contact between the catalyst and the solid biomass by limiting the settling of the catalyst.

The reactions are carried out under a hydrogen atmosphere under reaction conditions. Reaction conditions include a reactor operated at a temperature between 200° C. and 450° C., and at a hydrogen pressure between 1.4 MPa (200 psia) and 14 MPa (2000 psia). Preferred temperature conditions are between 300° C. and 400° C., and preferred operating pressures are between 3.5 MPa (500 psia) and 7 MPa (1000 psia). The space velocity ranges for this process are from 0.1 to 5.0 $hr^{-1}$.

The catalyst used in the slurry reactor has a deoxygenation function for breaking up the large lignin molecules held together through ether linkages. This deoxygenation function may be an acid function, metal function, or a combination of these two. An example of an acid deoxygenation catalyst is a large pore acidic zeolite catalyst, which is preferred. In a preferred embodiment, the zeolytic catalyst also includes a metal function for hydrogenation. Another embodiment provides for a metal on a slightly acidic support such as alumina. Metals used in this process as a deoxygenation function include chromium (Cr), molybdenum (Mo), tungsten (W), nickel (Ni), palladium (Pd), and platinum (Pt), and mixtures of the metals. The metals for hydroprocessing can also be in the sulfided form, using such mixed metal sulfides as NiMoS or NiWS. Methods of production of these catalysts are known to those of skill in the art and are not detailed here. When a metal is used on the catalyst, a less acidic support, such as alumina, is preferred for the deoxygenation catalyst.

The catalytic process deoxygenates through one of two pathways, activating the hydrogen and deoxygenating the feedstock producing smaller organic compounds and water, and decarboxylating the feedstock producing smaller organic compounds and carbon monoxide and carbon dioxide.

In another embodiment, the process for preparing biomass for slurry processing includes adding a dispersion agent to the biomass. The dispersion agents are listed as above, and create a dispersed phase. To prevent settling of small solid particles, a second, less volatile dispersion agent can be added to create a suspension phase. The suspension phase provides for enhanced surface areas of the biomass for processing. The suspension phase is passed to a hydroprocessing unit, and the suspension phase is contacted with a hydroprocessing catalyst under a hydrogen rich atmosphere. A process stream comprising oxygenates and aromatic compounds is produced in the hydroprocessing unit. Some suspension phases will not react under these conditions and can be recycled for a more efficient operation.

Further processing of the process stream can include separating the process stream into an aqueous stream and a non-aqueous stream. Smaller useful hydrocarbons and oxygenates are then recovered from the process streams.

EXAMPLE 1

Dispersion of the lignocellulose is important for enabling the catalyst to contact the lignocellulosic material. The following experiments were performed to study the dispersion of the lignocellulose and the ability to create a suspension of the solids in a liquid.

The concept called for using a solvent that facilitated dissolution and/or dispersion of the solid lignin into a liquid phase. Therefore, wet solid lignin was added to various polar solvents to determine solubility. The lignin was added in an amount of one gram to 5 grams of the solvent, and was found to be soluble in tetrahydrofuran (THF), acetone and glycerol. The lignin was insoluble in the methyl tert-butyl ether (MTBE).

TABLE 1

| Solubility of Wet Lignin in Polar Solvents | |
| --- | --- |
| Polar Aprotic Solvent | Result after mixing |
| MTBE | insoluble |
| THF | soluble |
| Acetone | soluble |
| Glycerol | soluble |

As shown in Table 1, polar solvents having a relatively small molecular size produced a solution when mixed with wet lignin. The solution disperses the lignin in the liquid phase for ease of contact with the catalyst. While not being bound by any theory, the solubility increases with more polar protic compounds.

In addition, after forming a suspension, the lignocellulose is then processed by contacting the suspension with a catalyst in a reactor. Experiments were performed in a batch reactor where a lignin suspension was mixed with a catalyst and the reaction was then carried out under reaction conditions. After processing, the products from the reactor were analyzed.

EXAMPLE 2

Glycerol was mixed with wet solid lignin and combined with a catalyst in the relative amounts of 145 g, 40 g and 40 g. The catalyst was a sulfided NiMo hydroprocessing catalyst. The mixture was placed in a batch reactor and heated to 300° C. at a pressure of 10.3 MPa (1500 psig), and with hydrogen flowing over the mixture at 1000 sccm. Deoxygenation begins as the temperature approaches 300° C. and is shown by the immediate production of CO and $CO_2$. The $CO_2$ quickly goes to greater than 10% of the gas mixture and remains above 10% for 30 minutes. A sample of gas was drawn and analyzed indicating $CO_2$ was 30% of the gas phase by volume. The solid biomass feedstock and the glycerol underwent deoxygenation during the experiment. Upon unloading of the reactor, the remaining solid consisted of approximately 40 g of catalyst and approximately 2 g of further solids from the lignin. Very little char was produced under these conditions.

The glycerol-lignin mixture generated products in a gas phase. The gas was passed through a dry ice cold trap to condense about 118 g of aqueous and hydrocarbon products. In the trap there were about 32 g of hydrocarbons recovered and analyzed by gas chromatography-mass spectroscopy (GC MS). The yields from the GC MS are shown in Table 2, and show a substantial amount of hydrocarbons useful as components for fuels, aromatics, naphthenes, paraffins, olefins, or other chemical precursors, phenols, olefins, etc. While some products are possibly produced from the glycerol, such as the alcohols, other products are hard to produce from glycerol but are readily produced from the deoxygenation of lignin. The major products come from the deoxygenation of the lignin molecules liberating the aromatic rings found in the lignin to form such chemicals as phenols and aromatics. Naphthenes are formed by the hydrogenation of aromatic ring compounds. The lack of charring and the significant amounts of lignin monomer products show that direct conversion of biomass has occurred.

TABLE 2

| GC MS of HC Trap | |
| --- | --- |
| | Mass % |
| Ketones | 20.10 |
| Phenols | 17.32 |
| Aromatics | 15.09 |
| Naphthenes | 13.08 |
| Paraffins | 11.96 |
| Olefins | 9.40 |
| Thiols | 1.64 |
| Alcohols | 0.86 |
| Aldehydes | 0.04 |
| Other | 8.84 |

While the invention has been described with what are presently considered the preferred embodiments, it is to be understood that the invention is not limited to the disclosed embodiments, but it is intended to cover various modifications and equivalent arrangements included within the scope of the appended claims.

The invention claimed is:

1. A process for preparing solid biomass for slurry processing comprising:
adding an organic solvent to solubilize and disperse the solid biomass that comprises lignocellulose material comprising lignin and cellulose;
adding a second less volatile dispersion agent, thereby creating a dispersed lignocellulose phase comprising solid particles of biomass suspended in a liquid organic solvent;
adding water to the dispersed lignocellulose phase to solubilize oxygenates and further disperse polar organic compounds; and
deoxygenating the dispersed lignocellulose phase, without separation of the dispersed lignocellulose phase, by contacting the lignocellulose material with an undissolved solid catalyst in a slurry reactor at reaction conditions to break apart the biopolymers in the dispersed phase, thereby creating a deoxygenated organic phase at a temperature of from about 300° C. to about 450° C., wherein the undissolved solid catalyst comprises material selected from the group consisting of alumina, zeolite, Cr, Mo, W, Ni, Pd, Pt, metal sulfides, and mixtures thereof.

2. The process of claim 1 wherein the undissolved solid catalyst is in a dispersed colloidally suspended phase prior to the addition to the dispersed phase.

3. The process of claim 1 further comprising pressurizing the dispersed lignocellulose phase with the undissolved solid catalyst under a hydrogen atmosphere to a pressure of from about 1.4 MPa (200 psia) to about 14 MPa (2000 psia).

4. The process of claim 1 further comprising flowing hydrogen over the dispersed lignocellulose phase with the undissolved solid catalyst.

5. The process of claim 1 wherein the undissolved solid catalyst is a catalyst with a zeolite deoxygenation function.

6. The process of claim 5 wherein the undissolved solid catalyst includes a base metal selected from the group consisting of Ni, Cr, Mo, W, Pt, Pd, and mixtures thereof.

7. The process of claim 6 wherein the base metal is in a sulfided form.

8. The process of claim 1 wherein the organic solvent is selected from the group consisting of glycerol, tetrahydrofuran, acetone, methyl tert-butyl ether, and mixtures thereof.

9. A process for preparing solid biomass for slurry processing comprising:
adding an organic solvent to solubilize and disperse the solid biomass that comprises lignocellulose material comprising lignin and cellulose;
adding a second less volatile dispersion agent, thereby creating a dispersed lignocellulose phase comprising solid particles of biomass suspended in a liquid organic solvent;
adding water to the dispersed lignocellulose phase to solubilize oxygenates and further disperse polar organic compounds; and
deoxygenating the dispersed lignocellulose phase, without separation of the dispersed lignocellulose phase, by contacting the lignocellulose material with an undissolved solid catalyst in a slurry reactor at reaction conditions to break apart the biopolymers in the dispersed phase, thereby creating a deoxygenated organic phase at a temperature of from about 250° C. to about 450° C., wherein the undissolved solid catalyst comprises material selected from the group consisting of alumina, zeolite, Cr, Mo, W, Ni, Pd, Pt, metal sulfides, and mixtures thereof, and wherein the organic solvent comprises glycerol, tetrahydrofuran, acetone, and methyl tert-butyl ether.

10. A process for preparing biomass for slurry processing comprising:
- adding a dispersion agent to the biomass that comprises lignin and cellulose, thereby creating a dispersed phase;
- adding a less volatile liquid to the dispersed phase, thereby creating a suspension phase;
- adding water to the suspension phase to solubilize the oxygenates and further disperse polar organic compounds;
- passing the suspension phase to a hydroprocessing unit, wherein the hydroprocessing unit is operated as a slurry reactor at a temperature of from about 300° C. to about 450° C.;
- contacting the suspension phase, without separation of the suspension phase, with a hydroprocessing catalyst that comprises material selected from the group consisting of alumina, zeolite, Cr, Mo, W, Ni, Pd, Pt, metal sulfides, and mixtures thereof, thereby creating a process stream; and
- recovering and recycling the less volatile liquid.

11. The process of claim 10 wherein the hydroprocessing catalyst comprises a large pore catalyst with a zeolitic deoxygenation function.

12. The process of claim 11 wherein the hydroprocessing catalyst includes a base metal selected from the group consisting of Ni, Cr, Mo, W, Pt, Pd, and mixtures thereof.

13. The process of claim 12 wherein the base metal is in the sulfided form.

14. The process of claim 12 further comprising separating the process stream into a first aqueous stream comprising oxygenates and a second non-aqueous stream.

15. The process of claim 10 further comprising pressurizing the suspension with the hydroprocessing catalyst under a hydrogen atmosphere to a pressure of from about 1.4 MPa (200 psia) to about 14 MPa (2000 psia).

* * * * *